April 22, 1930.

W. W. VILNEAU ET AL

HARDWOOD FLOOR NAILING MACHINE

Re. 17,651

Original Filed June 13, 1927

4 Sheets-Sheet 1

INVENTORS.
Walter W. Vilneau
Elbert Chittenden
BY
Carlos P. Griffin
ATTORNEY.

April 22, 1930.

W. W. VILNEAU ET AL

HARDWOOD FLOOR NAILING MACHINE

Re. 17,651

Original Filed June 13, 1927

4 Sheets-Sheet 2

INVENTOR.
Walter W. Vilneau
Elbert Chittenden
BY
Carlos P. Griffin
ATTORNEY.

W. W. VILNEAU ET AL
April 22, 1930. HARDWOOD FLOOR NAILING MACHINE Re. 17,651
Original Filed June 13, 1927 4 Sheets-Sheet 3
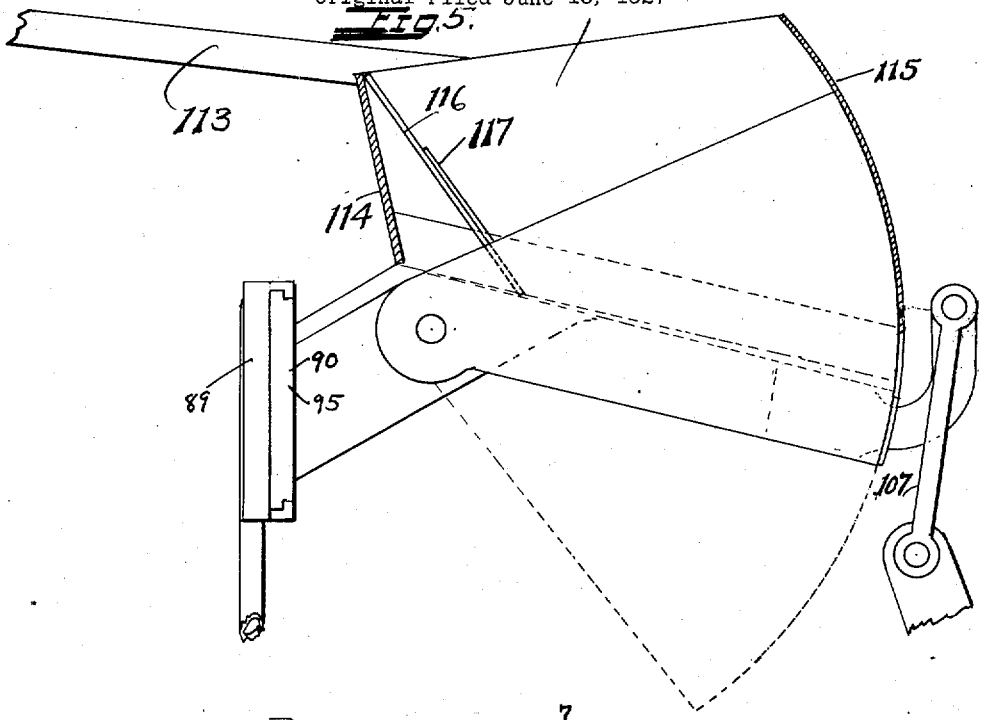
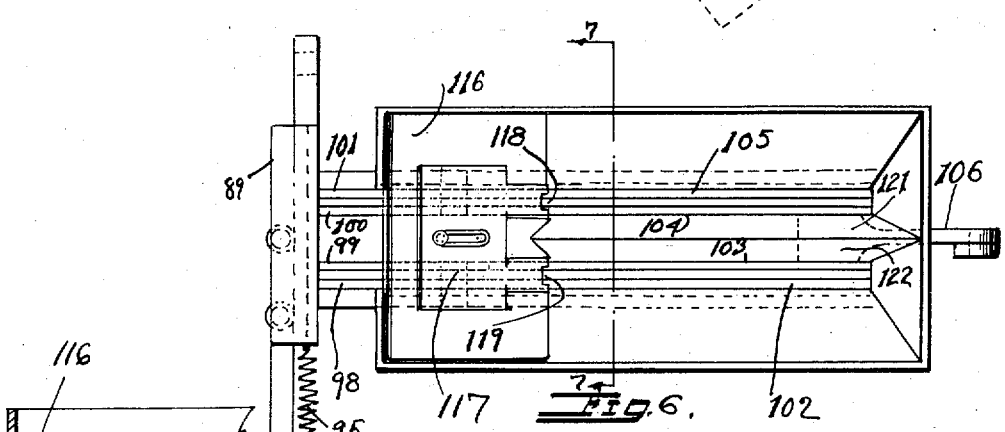
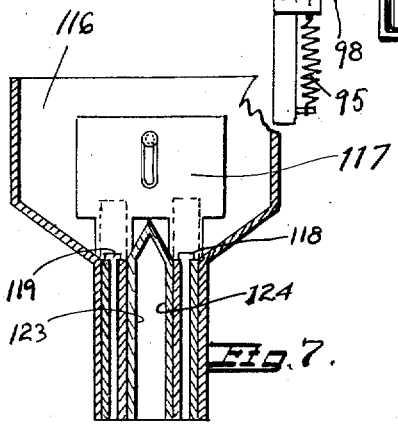
INVENTOR.
Walter W. Vilneau
BY Elbert Chittenden
Carlos P. Griffin
ATTORNEY.

April 22, 1930.
W. W. VILNEAU ET AL
HARDWOOD FLOOR NAILING MACHINE
Re. 17,651
Original Filed June 13, 1927
4 Sheets-Sheet 4
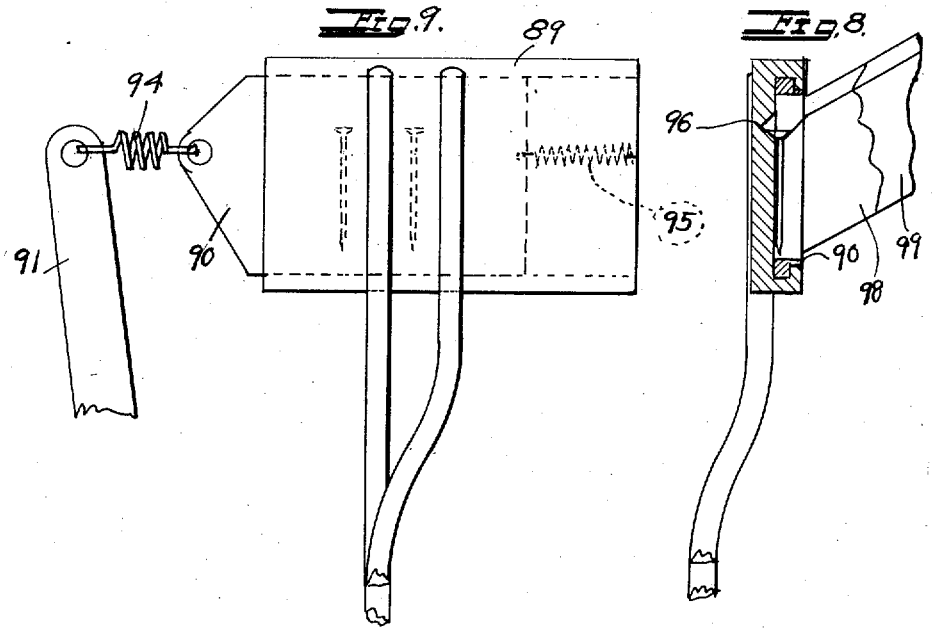
INVENTOR.
Walter W. Vilneau
BY Elbert Chittenden
Carlos P. Griffin
ATTORNEY.

Reissued Apr. 22, 1930

Re. 17,651

UNITED STATES PATENT OFFICE

WALTER W. VILNEAU AND ELBERT CHITTENDEN, OF PALO ALTO, CALIFORNIA, ASSIGNORS OF ONE-THIRD TO HENRY E. JENSEN, ONE-THIRD TO WELLS P. GOODENOUGH, AND ONE-THIRD TO WALTER W. VILNEAU, ALL OF PALO ALTO, CALIFORNIA

HARDWOOD-FLOOR-NAILING MACHINE

Original No. 1,671,660, dated May 29, 1928, Serial No. 198,472, filed June 13, 1927. Application for reissue filed December 27, 1928. Serial No. 328,672.

This invention relates to a hardwood floor nailing machine and its object is to drive a row of nails two at a time across the entire floor. It will be understood by those skilled in the art that the ordinary hardwood flooring consisting of narrow strips about 3/8 of an inch thick and two inches wide is first fitted tightly into the room. The workman then decides where he will place the several rows of nails used for securing the hardwood to the pine floor base, whereupon he aligns the machine as he may desire and proceeds to drive a row of nails, two at a time, entirely across the floor. With the present machine the first two nails can be driven very close to the wall and the machine is actuated to back away from the nails thus driven, which means that when the machine reaches the opposite side of the room that it must be turned around and the nails driven into a dozen or more boards with the machine traveling in the opposite direction from which it has just come.

Another object of the invention is to drive two nails at a time, one nail in each one of the two boards, and to provide a guide which will enable the workman to know at a glance that the machine is moved the proper distance after each nailing operation, to insure the proper spacing of the nails relative to each other.

Another object of the invention is to provide means whereby the shock of the hammer striking the nail drivers will be taken up by the spring of the floor rather than upon the frame of the nail driving machine, thereby making it easier upon the workman and less wearing upon the frame of the machine itself.

Another object of the invention is to provide means for feeding the nails into the nail chuck which will insure a constant line of nails in position to drop into the feeding tubes whenever the feed plate is shifted to the proper inclined position.

Another object of the invention is to provide means whereby the amount of movement of the nailing machine can be varied to accommodate it to hardwood floor strips of different widths.

Another object of the invention is to provide means whereby the operator may adjust a handle for the use of his left hand to a convenient position to steady the machine with that hand while he operates the driving mechanism with the other hand.

Another object of the invention is to provide means whereby the nail feeding tubes are moved out of alignment with the openings through the nail chuck during the downward movement of the nail drivers.

Another object of the invention is to provide means whereby the frame moving means, i. e., the feeding device, may be put into operation at any given stroke or allowed to remain inoperative on any given stroke as may be desired.

Other objects of the invention will be apparent as the description proceeds.

An embodiment of the invention is shown in the accompanying drawings in which the same reference numeral is applied to the same portion throughout the several figures of the drawings and of which there may be modifications.

Fig. 1 is a side elevation of the complete machine showing it passing over an ordinary hardwood floor with four nails already driven, and the driving mechanism ready to drive the next pair of nails in two separate boards;

Fig. 1[a] is a plan view of the front supporting base of the machine showing the application thereto of the gage;

Fig. 1[b] is a detail view of the latch 58 showing the pin 61;

Fig. 5 is a vertical sectional view through the nail hopper showing the arm which raises and lowers to pick a string of nails from the heterogeneous mass of nails in the hopper whereby they are aligned for feed to the tubes and nail chuck;

Fig. 6 is a plan view of the nail hopper showing the pair of movable bars for picking up two rows of nails at a time;

Fig. 7 is a vertical sectional view through the hopper on the line 7—7 Fig. 6, to show the relation of the hopper sides to the movable bars operating therein;

Fig. 8 is a transverse vertical section of the device for dropping two nails at a time into the feed tubes and chuck;

Fig. 9 is a front elevation of the nail feeder shown in Fig. 8.

Figure 1:
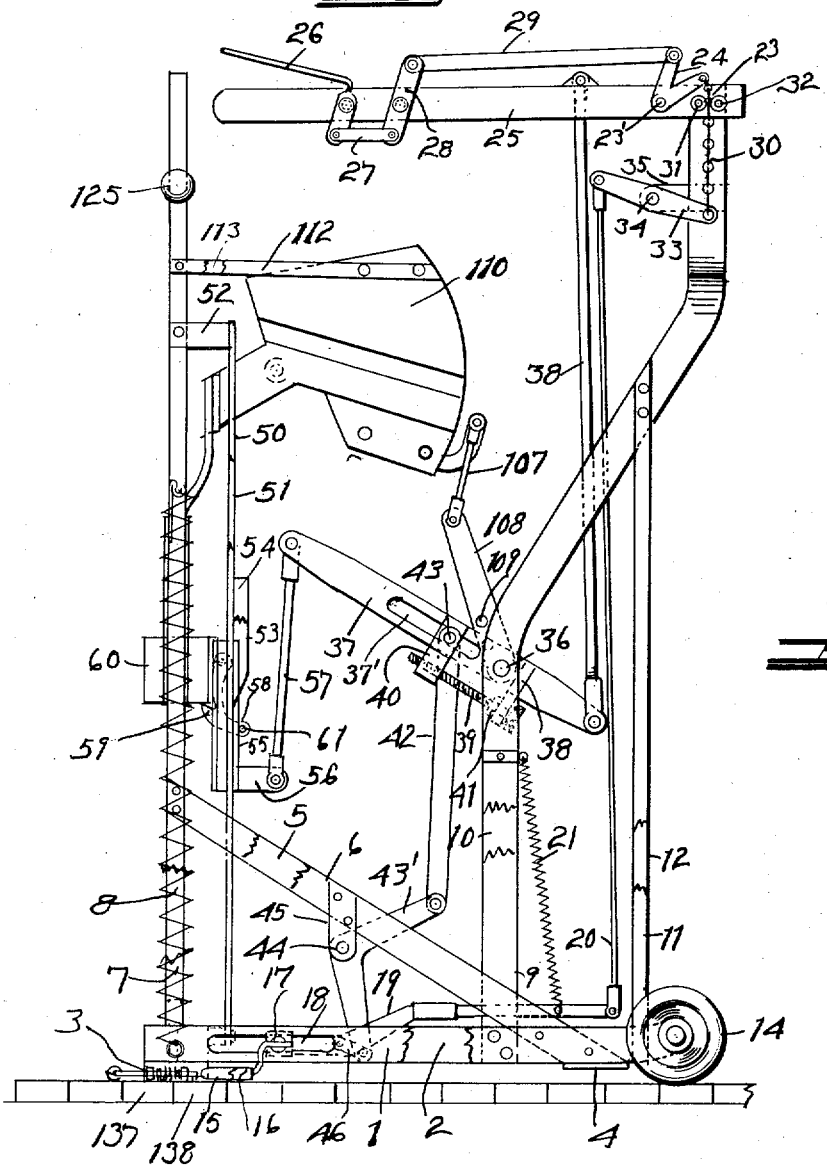
Figure 1B:
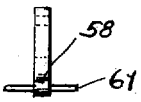
Figure 1A:
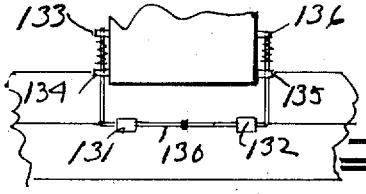

The machine comprises a frame consisting of a pair of longitudinally extending side rails 1 and 2, connected at their forward ends by a nail chuck supporting plate 3. Connected to each of the side rails of the frame adjacent the plate 3 is a transversely extending brace member 4. Brace members 5 and 6 are provided, which are connected at their lower ends to the side rails 1 and 2 respectively and the ends of the brace member 4. At their upper ends the brace members 5 and 6 are connected to upwardly extending posts 7 and 8 which are positioned at the front ends of the rails 1 and 2 respectively.

A pair of oppositely disposed vertical and rearwardly extending posts 9 and 10 are secured to the rails 1 and 2 respectively and are further supported by a pair of posts 11 and 12 rising vertically from these rails adjacent the rear ends thereof. The rear end of the frame is held in elevated position above the surface over which the same travels by wheels 13 and 14 connected to the rear ends of the rails 1 and 2.

When in operation the machine rests on the wheels and on the plate 3 as shown in Fig. 1, but when it is to be moved for the feed the nailing end of the machine is slightly lifted by a pair of feet 15 and 16 on opposite sides of the machine and supported by a bar 17. The bar 17 is carried for sliding pivotal movement in a slot 18 long enough to account for the usual movement of the machine from one position to another in the nailing of hardwood floors. An arm 19 extends from the cross bar 17 rearwardly to connect the lower end of a vertically extending rod 20.

The weight of the arm 19 and rod 20 and machine is balanced by a long spiral spring 21 secured at its upper end to the back of the post 9 to effect the feed as will be later explained.

The posts 9 and 10 are offset at their uppermost portions as indicated at 22 to provide a support for the pivot 23, said pivot consisting of a bolt extending from one post to the other, and a pivot 23′ is provided for supporting bell crank 24. A lever 25 is carried by the pivot 23 and is provided with a lever 26 at its operating end pivotally connected to a link 27 pivotally connected to another lever 28 mounted on the hand lever 25. A link 29 is pivotally connected to the lever 28 and to the bell crank 24. The bell crank 24 is in turn connected to a chain 30 which extends between two guide rollers 31, 32 on the rear end of the lever 25 and this chain is connected at its lower end to a lever 33 pivotally mounted at 34 on a lug 35 extended toward the nailing end of the machine from the post 10. This lever 33 is also pivotally connected to the upper end of the rod 20.

Intermediate the ends of the posts 9 and 10 is a shaft 36 which supports the operating lever 37 which lever is connected at its rear end to the rod 38 which rod is pivotally connected at its upper end to the hand lever 25.

The lever 37 is provided with a depending lug 38 and a second lug 40 mounted for sliding movement in slot 37′. The adjustment of lug 40 relative to lug 38 is obtained by means of screw 39, and this screw is provided with a fixed nut 41 to permit the rotation of the screw without effecting longitudinal movement thereof. The adjustment of lug 40 controls the throw of the feed link 42 which is pivotally connected thereto at 43.

At its lower end the link 42 is connected to a bell crank 43′ pivotally mounted at 44 to a depending lug 45 secured to the side brace 6 and the lower end of this bell crank is connected by a short link 46 to the arm 19 for an object presently to be explained.

At the back of the two posts 7 and 8 are two vertical guide bars 50, 51. These guide bars are secured to the back of the nail chuck supporting plate 3 at their lower ends and to a cross bar 52 connected to the posts 7 and 8 at their upper ends. The guide bars are provided on their rear faces about midway of their height with upwardly and rearwardly tapering cam members 53 and 54. A slide member 55 is disposed between the two guides 50, 51 and is provided with a horizontally extending lug 56 at its lower end pivotally connected to the link 57 which latter is pivotally connected at its upper end to the lever 37. The slide 55 carries a depending latch 58 formed with a hook 59 to engage the underside of the hammer head 60 and the latch is further provided with a horizontally extending pin 61 extending therethrough, which pin engages both of the inclined surfaces of the cams 53, 54 to release the hammer at the proper moment.

The plate 3, which forms the lower connecting means between the rods 7 and 8, also forms the support for the nail chuck which consists of the two members 62, 63 between which the nails are dropped when they are to be driven into the floor. These members are held in their proper location by means of two light springs 64, 65. Two plates 66 and 67 are connected to the under cut recesses of the plate 3 to allow the two parts of the nail chuck to separate as much as may be necessary due to the passing therethrough of the nail drivers 68, 69.

There are two holes through the plate 3 to simultaneously receive a pair of nails and in addition there are two holes through the plate which receive the rods 70, 71, said rods having flat heads 72, 73 on their lower ends with striking heads 74, 75 on their upper ends. By this construction it will be seen that after the full force of the hammer 60 on the nails has been delivered any remaining force will be transmitted to the heads 74, 75 which in turn are supported by the flat heads 72, 73 of considerable extent resting upon the floor. The chuck 62 is pushed back by having the nail sets or nail drivers 68, 69 strike a flat steel plate 76 which is connected to and extends as a protection over the lower portions of the two tubes 77, 78. The nail drivers will readily push both the chucks back the desired amount to allow the nails to be driven.

Both chucks are centered after the removal of the drivers by means of two screws 66′, 67′ extending through the corresponding bars 66 and 67 against which the chuck members are pushed by the springs. The hammer head or striker 60 is connected to two slide bars or guides 80, 81, said guides having their upper and lower ends outturned and notched to slide on the posts 7 and 8. These slides also carry a cross bar 82 which extends in front of the posts 7 and 8 and is provided with lugs 83, 84 at its outer ends and to which the ends of the long spiral springs 85, 86 are connected. The lower ends of said spiral springs are connected to two outwardly extending studs 87, 88 secured to the ends of the plate 3, see Fig. 2. The brass nail feed tubes 77, 78 extend from the top of the chuck to the individual nail feeder. This nail feeder consists of an outer casing 89 which has a slide 90 enclosed therein. This slide is reciprocated each time a nail is driven by means of a lever 91, the lower end of which is shaped so it will be engaged by the hammer 60 when it rises and thereby cause two nails to be dropped into the nail chuck just before the hammer is released.

The lever 91 is pivotally mounted on the post 8 at 93 and at its upper end it is connected by means of a small stiff spring 94 to the nail feeding slide 90. This nail feeding slide is so constructed that it will receive only two nails at a time, and when the slide is moved a short distance to the right, Fig. 9, it will cause two nails to be dropped into the tubes 77, 78 to be delivered to the nail chuck. A spring 95 aids in restoring the feeder slide 90 to its desired position and it will be seen that there is a groove 96 within the casing 98 to allow the necessary lateral movement of the nail head and to permit the nail to pass into the tube. In the back of the casing for each tube there are four inclined rails 98, 99, 100, 101, a pair of nail feed slots being thus produced. Hinged to the members 98–101 inclusive, by mortised and recessed hinges are four oscillating hinge plates 102 to 105 which are connected to an operating arm 106 at their outer ends. These plates are sector shaped and operate in the bottom of a hopper 114. This arm 106 is connected to a link 107 which link is in turn pivotally connected to a lever 108. This lever is loosely mounted on the rod 36 and it is raised to the position shown in Figs. 1 and 5 by means of a pin 109 which is engaged by the lever 37 when it lifts the hammer. The nail hopper is adapted to receive two or three pounds of nails at a time. It consists of the two side members 110, 111 which are connected to the supporting bars 112, 113, the latter being carried by the posts 7 and 8. The hopper is circular on one side at 115 with slotted false bottom at 116 extending down over the movable feed bars. The false bottom also has a movable retarding plate 117 slidably mounted on the plate 116 with notches 118, 119 to permit only one row of nails at a time to pass over each of the feed bars.

The hopper sides 110, 111 have an inclined portion and a vertical portion while the hopper bottom between the two movable feed bars consists of a single plate with two inclined portions 121, 122 and with two vertical portions 123, 124 in contact with the vertically movable nail feeding bars. The result of the foregoing construction is that the nails will be agitated in the feed hopper and they will first slide one way and then the other, some nails always sliding forward on the short feed bars 98 to 101.

The operation of the machine is as follows:—

Assuming the nail hopper to have had several pounds of nails placed in it and assuming the machine to have been operated several times to raise and lower the feeder bars 102 to 105, it will be ready to proceed across the floor.

The workman grasps the adjustable handle 125 which screws into a slide 126 and sets this handle at a suitable height on the post 7 for a man of his stature. He will then grasp the lever 25 and handle 26 with his right hand. He then tilts the machine slightly and rolls it to the place where he wishes to begin work, the length of the machine extending transversely with respect to the length of the hardwood strips forming the floor. He then aligns the machine and places it so the gauge member 130, which consists of a wire yoke carrying rollers 131, 132, mounted in projecting ears 133 to 136 in opposite ends of the supporting plate 3 will be over the crack between the last board being nailed and the next to the last board as indicated in Fig. 1[a] which will bring the nailing position of the chuck to the adjoning edges of the two boards marked 137, 138 of Fig. 1, i. e., the position for nailing as shown in that figure. Fig. 1 shows the hammer raised and within a short distance of being released by the two members 53, 54 and from the position shown. The operation is as follows:—

Figure 2:
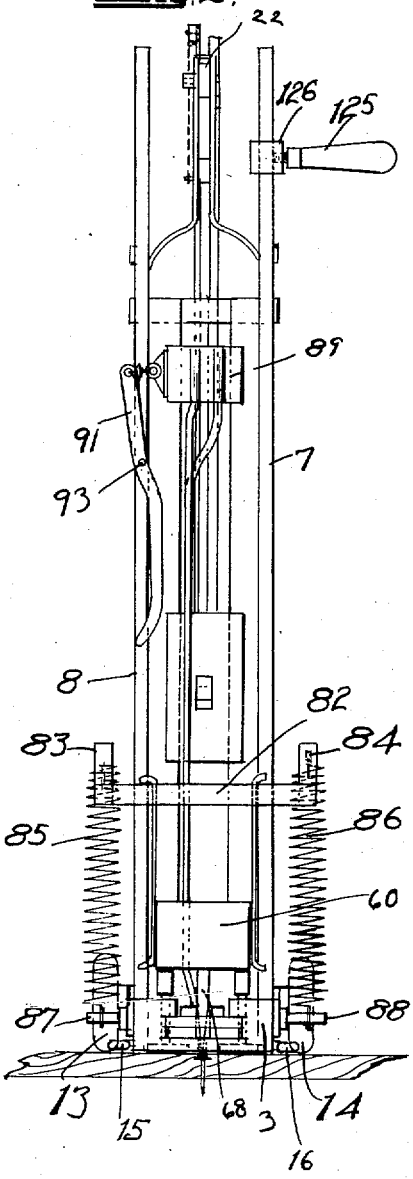
Fig. 2 is a front elevation of the complete machine with the gage omitted.
Figure 4:
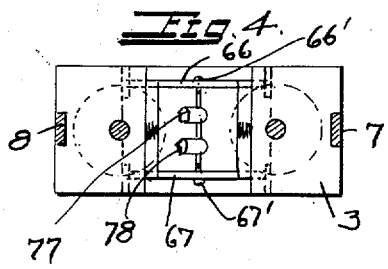
Fig. 4 is a sectional plan of the supporting plate and nail chuck showing a portion of the lower end of the nail feeding tubes.
Figure 3:
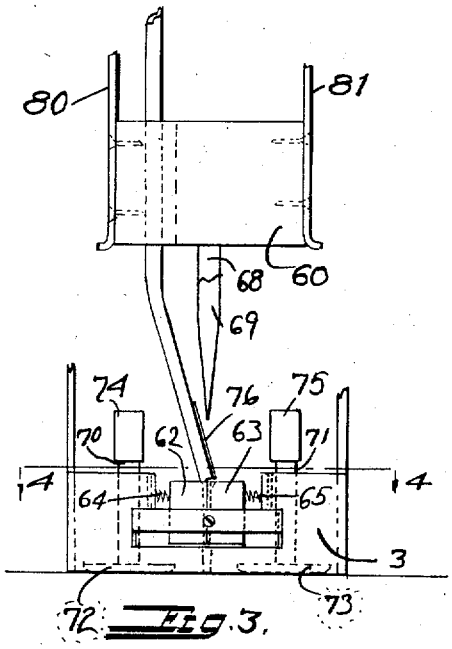
Fig. 3 is a front elevation of the nail chuck and nail driving head with the driving head partly raised.

The workman holds his hand steadily on the handle 125 and continues the downward movement of the handle end of the lever 25, holding the lever 26 close against the lever 25. The first action to take place is the release of two nails to drop into the nail chuck followed by the release of the latch which holds the hammer 60 by the cams 53, 54, whereupon the hammer will be pulled down by its springs 85, 86 with sufficient force to drive the nails and to finally rest upon the tops of the heads 74, 75 as shown in Fig. 2. At this same time the nail chuck members 62, 63 are forced apart sufficiently to permit the nail drivers 68, 69 to strike both nails and force them into the floor with their heads well countersunk. During this time the workman has had the chain 30 pulled up slightly if he does not want to advance the machine. If he is ready to start across the floor he releases the pressure on the handle 26, with the result that immediately after the nails have been struck by the hammer the spring 21 lifts the lever 19 enough to take the weight of the frame on the two feet 15 and 16 and as the workman raises the lever 25 to reengage the hammer, the bell crank 43 pushes on the link 45 sufficiently to move the entire nailing machine rearwardly the width of one board. The workman verifies the position by looking at the gauge 130 to make sure that he does not drive any nails too close to the edge of the boards. The quantity of feed is governed by the proper setting of the screw 39. During the time that the lever 37 is moving downwardly to reengage the hammer 60, the lever 108 will also move downwardly until it reaches the stop indicated by the dotted line position of the hopper, Fig. 5, to stir up the body of nails and to collect a few more nails between the feed bars 102–105 inclusive. These feed bars are then forced upwardly as the hammer rises until some of the nails carried by them slide off onto the short feed bars on the left portion of Fig. 5. At the same time, two nails are dropped on the transversely movable slide 90 and those two nails are dropped into the brass feed tubes 77, 78 as soon as the bar 80 strikes the lower end of the lever 91 and an instant prior to the hammer release.

Having thus described our invention, what we desire to secure by Letters Patent of the United States is as follows, but modifications may be made in carrying out the invention as shown in the drawings and in the above particularly described form thereof, within the purview of the annexed claims:

1. A floor nailing machine comprising a frame, a nail chuck at the bottom of the frame, means to drop a pair of nails into said nail chuck, means to drive each of said nails into the floor over which the machine is placed, movable floor engaging means to raise the front end of the machine, and means to automatically shift the entire machine a predetermined distance when so raised to drive a fresh set of nails at a new location.

2. A floor nailing machine comprising a frame, a nail chuck at the lower portion of the frame, means to drop a plurality of nails into said chuck, a vertically movable hammer adapted to strike the nails to drive them into the floor strips, movable floor engaging means to lift one end of the machine following the driving of one set of nails, and means to automatically move said machine a predetermined amount when so lifted to a fresh position for nailing the flooring strips.

3. A floor nailing machine comprising a frame, a nail chuck carried thereby, a hammer, a nail feeding hopper, means to drop a plurality of nails from the feeding hopper into the nail chuck, means to immediately thereafter release the hammer to drive said nails, means to raise one end of the machine as soon as the nail driving is completed, and means for shifting the entire machine into position for driving the next set of nails.

4. A floor nailing machine comprising a frame, wheels for supporting an end of said frame, a pair of movable feet for intermittently supporting the frame at its opposite end, a nail chuck adjacent the lower portion of the machine, a nail feeding hopper, means to deliver a plurality of nails from the nail hopper to the nail chuck, a vertically movable hammer, a swinging latch to engage and raise the hammer, means to release said latch from engagement with the hammer as soon as the nails have been dropped into the chuck, means carried by the hammer to engage and drive the nails, means to operate the supporting feet to lift the frame at one end after one set of nails has been driven, and means bearing upon the frame supporting mechanism to shift the frame to a position to drive the next set of nails.

5. A floor nailing machine comprising a frame, a nail chuck carried by said frame, a gage adjacent the nail chuck, a nail hopper, means to feed nails to said chuck, a nail hammer, means to raise said hammer, springs to increase the rapidity of action of said hammer, means to release the hammer immediately after the nails have been dropped into the chuck, means thereupon to lift the frame of the machine at one end, means to automatically shift the machine to a position for driving a new set of nails, and a series of manually operated levers at a convenient elevation for a workman to carry out the operation of the machine while standing at the side of the same.

6. A floor nailing machine comprising a frame, a chuck carried by said frame, means to feed nails into said chuck, a hammer for driving said nails, and a pair of movable floor stops supported by the floor and upon which the hammer strikes after the nails have been driven home.

7. A nailing machine comprising a frame, a nail chuck in said frame, a nail receiving hopper, nail feeding bars vertically oscillating in said hopper to accumulate a plurality of arranged nails, means to raise and lower said bars, individual feeding means consisting of a pair of inclined feeding bars and a horizontal plate, whereby a plurality of sets may be dropped into the nail chuck, a vertically movable hammer for driving said nails, springs to increase the speed and action of said hammer, a latch for raising the hammer, means to release the latch immediately after the nails have been dropped into the nail chuck, and a series of manually operated levers at a convenient height to enable a workman to operate the machine while standing at the side of it.

8. A nailing machine comprising a supporting frame, a nail chuck at the bottom of the frame, a nail hopper at the top of the frame, means to feed nails to the chuck from the hopper, a slotted nail assembling bar pivotally mounted to be raised and lowered through the pile of nails in the bottom of the hopper whereby a series of nails are assembled thereon in an orderly manner, a shorter slotted bar to deliver nails to the nail feeding mechanism, means to operate the nail feeding mechanism laterally whereby the desired number of nails is dropped at one time, a hammer and means to drive the nails, and means to drop the hammer upon the nail driving mechanism when the nails are dropped into the chuck.

9. In a floor nailing machine, a frame, nail feeding and driving mechanism supported by the frame, and a substantially U-shaped horizontally disposed gauge carried by the forward end of the frame and having its bight portion formed to overlie and contact with the abutting edges of a pair of boards to indicate the position of the nails being driven.

10. A floor nailing machine comprising a frame, nail feeding and driving mechanism carried by the frame, and automatic means carried by the frame and actuated by the driving mechanism to raise an end of the frame and to shift the machine a predetermined distance over the surface of the floor.

11. In floor nailing machine, a frame, a nail chuck in said frame, means for feeding nails to said chuck, driving mechanism for the nails, movable floor engaging means to raise an end of the frame, and means to automatically shift the machine a predetermined distance over the surface of the floor.

12. In a floor nailing machine, a frame, a chuck in said frame, a nail receiving hopper, means to feed nails from the hopper to the chuck, a vertically movable hammer for driving said nails, means for raising said hammer, means for elevating an end of the frame by the hammer raising means, and means to shift the machine a predetermined distance over the surface of the floor.

13. A floor nailing machine comprising a frame, a nail chuck carried by said frame, means to simultaneously feed a plurality of nails into said chuck, means to drive the nails, movable floor engaging means to lift an end of the machine following the driving of one set of nails, and means to automatically shift the machine a predetermined distance over the surface of the floor into position for driving the next set of nails.

14. In a floor nailing machine, a frame, nail feeding and driving mechanism, means to intermittently elevate an end of the frame, and means to automatically shift the machine a predetermined distance over the surface of the floor while said frame is in its elevated position.

15. In a floor nailing machine, a frame, a chuck in said frame, a nail receiving hopper, means to feed nails from the hopper to the chuck, a vertically movable hammer for driving said nails, means for raising said hammer, means for intermittently elevating an end of the frame after each driving operation, and means connecting the hammer raising means and the elevating means for actuating the latter when the hammer is raised to its driving position, and means for shifting said frame while the same is in its elevated position.

WALTER W. VILNEAU.
ELBERT CHITTENDEN.